No. 815,909. PATENTED MAR. 20, 1906.
T. C. DEXTER.
FRICTION CLUTCH.
APPLICATION FILED AUG. 29, 1905.
2 SHEETS—SHEET 1.
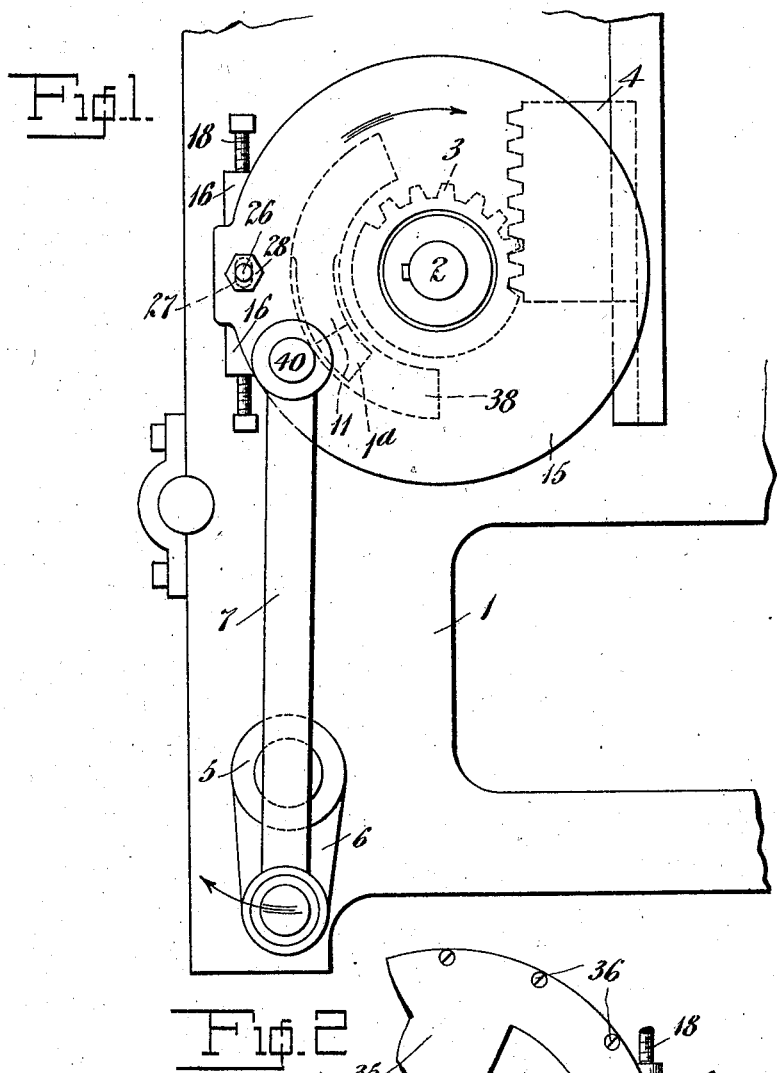
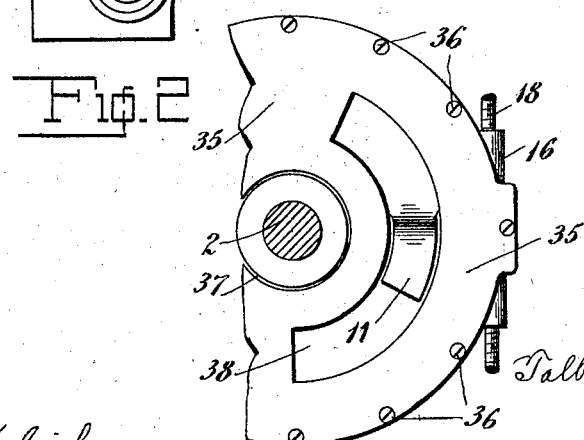
Witnesses
Talbot C. Dexter
Inventor,
By his Attorney

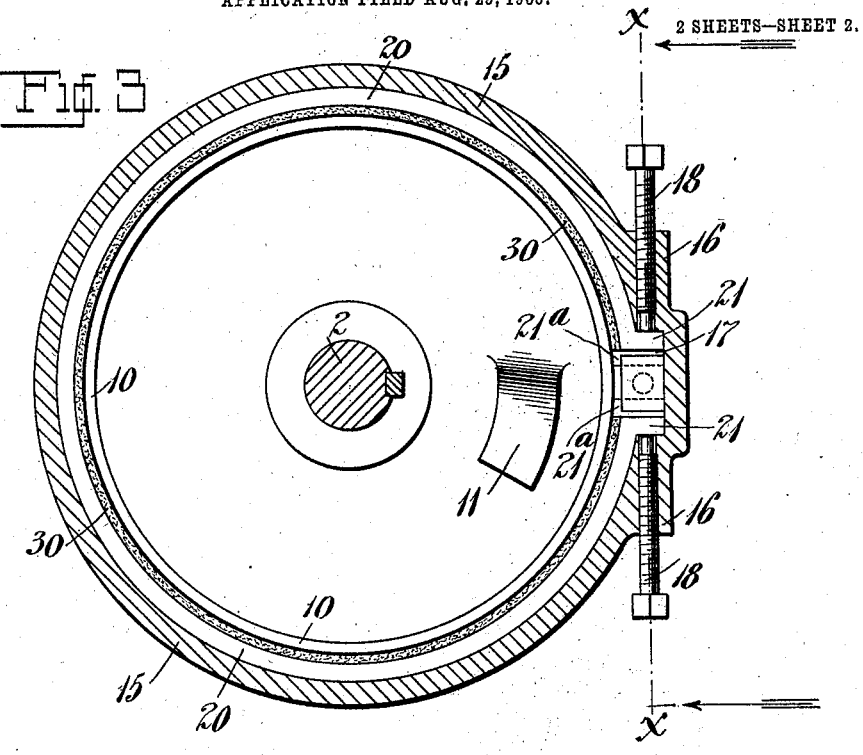
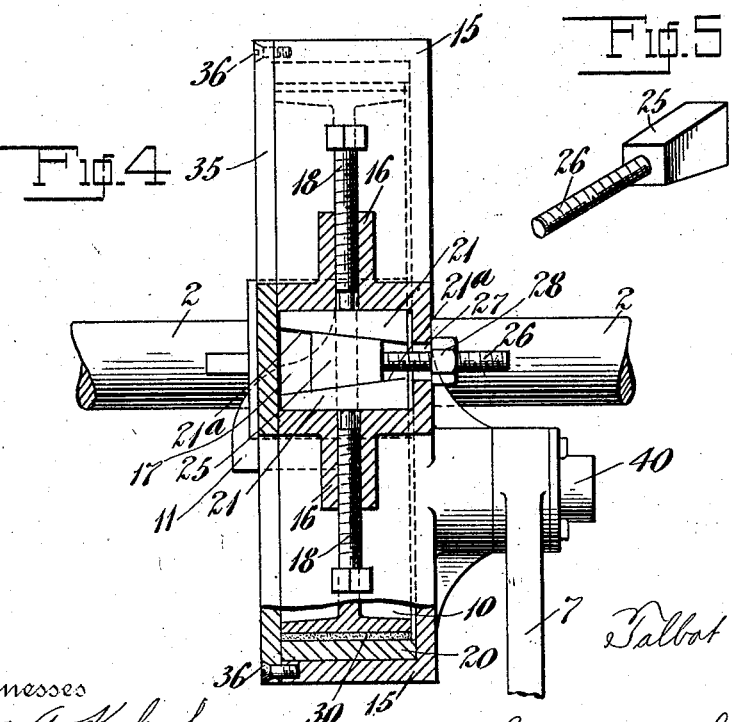

UNITED STATES PATENT OFFICE.

TALBOT C. DEXTER, OF PEARL RIVER, NEW YORK.

FRICTION-CLUTCH.

No. 815,909.            Specification of Letters Patent.         Patented March 20, 1906.

Application filed August 29, 1905. Serial No. 276,286.

*To all whom it may concern:*

Be it known that I, TALBOT C. DEXTER, a citizen of the United States, residing at Pearl River, in the county of Rockland and State of New York, have invented certain new and useful Improvements in Friction-Clutches, of which the following is a specification.

The object of my invention is to produce a simple, strong, and durable frictional clutch which can be readily adjusted to increase or decrease its frictional hold to meet varying requirements.

My improved frictional clutch was designed particularly for use in paper-cutting machines of the type illustrated in my application, Serial No. 246,139, filed February 17, 1905; but my invention is not limited to this use, but is of much wider application, since it is conveniently applicable to all mechanisms in connection with which friction-clutches are used.

My improved friction-clutch is of the type which embodies a friction-wheel member and an adjustable friction-band, and the novelty in my improved clutch lies in the construction and arrangement of the devices for adjusting the band member upon the friction-wheel member and for maintaining the band member in the desired adjusted position during operation.

Surrounding the frictional wheel member of my improved clutch is a drum formed with an internal radial recess or pocket, and interposed between the friction-wheel and drum is a split band whose ends project into said radial recess or pocket and are engaged on their inwardly-projecting faces by an adjustable wedge-shaped block and upon their outwardly-presented face by adjustable screws or bolts, the wedge-shaped block resting between the ends of the split band within the recess or pocket of the drum and being bodily movable in a plane parallel with the axis of rotation of the clutch, a threaded bolt projecting from the block through an opening in the end wall of the drum to receive an adjusting-nut which engages the end wall of the drum. The adjusting screws or bolts which engage the outwardly-presented faces of the ends of the split band are threaded through suitable bosses formed on the drum and extend tangentially with relation to the clutch. A strap or web of leather or other suitable frictional material is preferably interposed between the rim of the friction-wheel and the split band. By adjusting the wedge-shaped block and screws or bolts the friction hold of the clutch can be adjusted to a nicety.

In order that my invention may be fully understood, I will first describe the same with reference to the accompanying drawings, and afterward point out the novelty more particularly in the annexed claims.

In said drawings, Figure 1 is a detail side elevation of part of a paper-cutting machine of the type shown in my above-named application, illustrating my improved friction-clutch. Fig. 2 is a detail inside elevation of a part of the improved clutch. Fig. 3 is a vertical transverse sectional elevation of the clutch looking from the inside of the machine as illustrated in Fig. 1. Fig. 4 is an edge view of the same, parts being in section on the line *x x* of Fig. 3 and part being broken away. Fig. 5 is a detail perspective view of the adjustable wedge-shaped block.

1 is a part of the side frame of a paper-cutting machine.

2 is a transverse clamp-shaft suitably journaled in the side frame and carrying adjacent to its opposite ends pinions (indicated in dotted lines at 3) which mesh with rack-bars, (indicated in dotted lines at 4,) which rack-bars are suitably connected with the clamp of the paper-cutting machine.

5 is a crank-shaft suitably journaled in the machine-frame and driven in any suitable manner—such, for instance, as shown in my above-named application. The crank-shaft carries a crank 6, which is connected, through a pitman 7, with my improved clutch, which is mounted upon clamp-operating shaft 2 and will now be described in detail.

10 is a friction-wheel member of my improved clutch, said wheel member being rigidly keyed to shaft 2, as shown. The wheel member 10 carries an integral stop lug or projection 11, which is adapted to engage a part 1ª upon the machine-frame for limiting the return movement of the wheel 10 when the clamping-bar is returned to its inactive raised position.

Inclosing the friction-wheel 10 is a drum 15, which is free to rotate upon the wheel and its supporting-shaft 2. This drum 15 is formed with integral lugs or bosses 16 and an internal radial recess or pocket 17, arranged between the lugs or bosses 16. The lugs or bosses 16 are bored tangentially of the friction-wheel and threaded to receive the tangential adjusting screws or bolts 18, whose inner ends project into the recess or pocket 17 for the purpose which will presently appear.

Supported within the drum 15 is an expansible split steel band 20, whose adjacent ends are formed with outwardly-projecting flanges 21, which rest within the recess or pocket 17 of the drum, the outer faces of these flanges (forming the ends of the split band) being engaged by the inner ends of the screws or bolts 18. The inwardly-presented faces of the flanges 21 are oppositely inclined or beveled transversely to the flanges or to a plane parallel with the shaft 2, as indicated at $21^a$.

25 is a wedge-shaped block resting within the recess or pocket 17 between the inclined or beveled faces $21^a$ of the flanges 21, the inclination of the engaging face of the wedge 25 being approximately of the same degree as the inclination of faces $21^a$. Secured to the small end of the wedge 25 is a threaded bolt 26, which projects out through a slot or opening 27 in the end wall of the drum 15, said bolt 26 extending parallel with the shaft 2. An adjusting-nut 28 is threaded upon the bolt 26 and engages the end wall of drum 15 for securing the wedge 25 in desired adjusted position and for moving it in one direction.

Interposed between the inner face of the split band 20 and the rim of friction-wheel 10 is a strap or web of leather or other suitable frictional material, as shown at 30, the ends of this strap or web coinciding approximately with the ends of the split band 20.

The inner open end of the drum 15 is closed by the circular plate 35, secured to the rim of the drum 15 by screws 36. This plate 35 is formed with a central opening 37, which fits loosely over the hub of friction-wheel 10, and a concentric segmental slot 38, through which the stop-lug 11 projects and in which said lug may operate to allow relative movement between the friction-wheel and drum at the ends of the movements of the clutch.

Projecting from the end wall of the drum 15 is a journal-stud 40, rigidly braced upon the drum, the upper end of the pitman 7 being journaled upon the said stud 40 to connect drum 15 of the clutch with the crank 6 of the shaft 5.

When it is desired to contract the band 20 to tighten it upon the rim of the frictional wheel 10 to increase the frictional hold of the clutch, the nut 28 is screwed outwardly and the wedge 25 forced inwardly by a slight blow on the end of the bolt 26, the bolts 18 being then screwed inwardly to force the inclined faces of lugs 21 into engagement with the wedge 25. To expand the band 20 for lessening the frictional hold of the clutch, the reverse operation is performed—that is, the bolts 18 are screwed outwardly and the nut 28 is tightened upon bolt 26 to draw the wedge 25 outward. The operation of the clutch in its application to the paper-cutting machine, shown in my above-named application, Serial No. 246,139, will be clear with but a few words of explanation. The shaft 5 rotating in the direction indicated by the arrow imparts motion to the clutch, the drum 15 driving the wheel 10 through the frictional hold of the band 20. The parts of the clutch will rotate together until the clamping-bar of the paper-cutter engages the pile of sheets with the required pressure, when the frictional hold of the clutch will be overcome and allow the drum 15 and split band 20 to rotate upon the friction-wheel 10 until the end of the half-revolution of the crank 6 is reached. In the return movement the clutched parts move back together until the stop-lug 11 arrests the drive-wheel 10, when the drum 15 and band 20 will again slip upon the drive-wheel until the crank 6 reaches the end of its second half-revolution.

My improved clutch is of simple and powerful construction and can be readily adjusted to the desired frictional hold.

Having thus described my invention, the following is what I claim as new therein and desire to secure by Letters Patent:

1. A friction-clutch comprising a friction-wheel, a split friction-band encircling the friction-wheel, a wedge supported between the ends of the split band, and means engaging the ends of the band in opposition to the wedge.

2. A friction-clutch comprising a friction-wheel, a split friction-band encircling the friction-wheel, a wedge supported between the ends of the split band, means for adjusting the wedge for expanding the band and for allowing the contraction of the band, and adjustable means engaging the ends of the split band in opposition to the wedge for contracting the band and securing the ends of the band against the wedge.

3. A friction-clutch, comprising a friction-wheel, a split friction-band encircling the friction-wheel and formed with lugs or flanges at its ends, an adjustable wedge supported between the said lugs or flanges and means engaging said lugs or flanges in opposition to the wedge.

4. A friction-clutch, comprising a friction-wheel, a drum encircling the friction-wheel, a split friction-band inclosed between the wheel and drum, a wedge supported between the ends of the said split band, means for adjusting said wedge, and means engaging the ends of the split band in opposition to the wedge.

5. A friction-clutch, comprising a driven member, a driving member encircling the driven member, a split friction-band inclosed between the driven and driving members, said split band having radially-projecting lugs or flanges at its ends, a wedge movably supported between the said lugs or flanges, means for adjusting said wedge transversely of said lugs or flanges, and adjustable means engaging said lugs or flanges to hold them in contact with the wedge.

6. A friction-clutch, comprising a friction-wheel, a drum surrounding said wheel, a split friction-band interposed between the wheel and drum and provided with outwardly-projecting lugs or flanges, inclined inwardly-presented faces formed upon said lugs or flanges, a wedge-shaped block supported between the lugs or flanges in engagement with said inclined faces, means for adjusting said block, and means for confining the lugs or flanges in engagement with the block.

7. A friction-clutch, comprising a friction-wheel, a drum surrounding said wheel, a split friction-band interposed between the wheel and drum and provided with lugs or flanges projecting approximately radial to the friction-wheel, the inwardly-presented faces of said lugs or flanges being inclined transversely thereof, a wedge-shaped block supported between the lugs or flanges in engagement with said inclined faces, means for adjusting said block transversely of the lugs or flanges, and means for confining the lugs or flanges in engagement with the block.

8. A friction-clutch, comprising a friction-wheel, a drum surrounding said wheel, a split friction-band interposed between the wheel and drum and provided with outwardly-projecting lugs or flanges, a wedge-shaped block between the lugs or flanges and movable bodily transversely thereof, means for adjusting said block, and means for confining the lugs or flanges in engagement with the block.

9. A slip friction-clutch, comprising a friction-wheel, an oscillatory driving-drum encircling the friction-wheel, a split friction-band inclosed between the wheel and drum, a wedge supported between the ends of the split band, means for adjusting the wedge, means engaging the ends of the split band in opposition to the wedge, and means for operating the drum.

10. A slip friction-clutch, comprising a driven friction-wheel, an oscillatory driving-drum encircling the friction-wheel, a split friction-band inclosed between the wheel and drum and provided with radially-projecting lugs or flanges at its ends, a wedge movably supported between said lugs or flanges, means for adjusting said wedge, adjustable means engaging said lugs or flanges in opposition to said wedge, and operating means for oscillating the drum.

11. A slip friction-clutch comprising a driven friction-wheel, a driving-drum surrounding said wheel and formed with a radial recess or pocket, a split friction-band interposed between the wheel and drum and formed with lugs or flanges which project into said recess or pocket of the drum, a wedge-shaped block supported between said lugs or flanges, a screw for adjusting the said block, screws seated in the drum and engaging the outer faces of said lugs or flanges in opposition to the said wedge, and operating means including a rotary crank and a pitman for oscillating said driving-drum.

12. A friction-clutch comprising a wheel-shaped member, a drum-shaped member surrounding the wheel-shaped member, a split friction-band within the drum formed with outwardly-projecting lugs or flanges, friction material interposed between the split band and the wheel-shaped member, a wedge-shaped block, supported between the adjacent faces of said lugs or flanges, a screw for adjusting said block, and screws seated in the drum and engaging the outer faces of said lugs or flanges.

13. A friction-clutch, comprising a friction-wheel, a drum surrounding the friction-wheel and formed with a radial recess or pocket, a split friction-band within the drum formed with outwardly-projecting lugs or flanges, which rest in said recess or pocket, a wedge-shaped block supported in said recess or pocket between the adjacent faces of said lugs or flanges, a screw for adjusting said block, and tangential screws seated in the drum and projecting into said recess or pocket in engagement with the outer faces of said lugs or flanges.

14. A friction-clutch, comprising a friction-wheel, a concentric drum surrounding the friction-wheel, and formed with a radial recess or pocket, a split friction-band within the drum formed with outwardly-projecting lugs or flanges which rest in said recess or pocket, a wedge-shaped block supported in said recess or pocket between the adjacent faces of said lugs or flanges, a screw-bolt projecting from the wedge-block parallel with the axis of the friction-wheel for adjusting said block, a nut threaded upon said bolt and engaging the drum, and screw-bolts seated in the friction-drum and engaging the outer faces of said lugs or flanges.

TALBOT C. DEXTER.

Witnesses:
G. V. B. LERTCH,
V. E. MARSH.